(12) United States Patent
Danican et al.

(10) Patent No.: US 7,013,973 B2
(45) Date of Patent: Mar. 21, 2006

(54) METHOD OF COMPLETING POORLY CONSOLIDATED FORMATIONS

(75) Inventors: Samuel Danican, Houston, TX (US); Golchehreh Salamat, Sugar Land, TX (US); Alejandro Pena, Houston, TX (US); Erik Nelson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 243 days.

(21) Appl. No.: 10/605,975

(22) Filed: Nov. 11, 2003

(65) Prior Publication Data

US 2005/0098315 A1  May 12, 2005

(51) Int. Cl.
*E21B 33/138* (2006.01)
*E21B 43/26* (2006.01)
(52) U.S. Cl. .................. 166/263; 166/281; 166/292; 507/212; 507/269; 507/277
(58) Field of Classification Search ................ 166/263, 166/281, 283, 292; 507/212, 269, 276, 277
See application file for complete search history.

(56) References Cited

U.S. PATENT DOCUMENTS

| | | | | |
|---|---|---|---|---|
| 2,281,810 A * | 5/1942 | Stone et al. | ................. | 166/292 |
| 2,556,169 A * | 6/1951 | Crouch et al. | ............... | 166/295 |
| 3,070,160 A * | 12/1962 | Reistle, Jr. | ................... | 166/281 |
| 3,097,694 A * | 7/1963 | Kerver | ..................... | 166/280.1 |
| 3,411,582 A * | 11/1968 | Dale | ......................... | 166/292 |
| 3,487,877 A * | 1/1970 | Methven | ..................... | 166/295 |
| 3,626,699 A * | 12/1971 | Lees | .......................... | 405/263 |
| 3,847,638 A * | 11/1974 | Suman et al. | .......... | 106/287.17 |
| 3,904,304 A * | 9/1975 | Honegger | ..................... | 404/69 |
| 4,291,776 A | 9/1981 | Kupper et al. | .............. | 177/229 |
| 4,427,069 A | 1/1984 | Friedman | ..................... | 166/295 |
| 4,669,543 A | 6/1987 | Young | .......................... | 166/276 |
| 4,732,213 A | 3/1988 | Bennett et al. | ............. | 166/292 |
| 5,010,953 A | 4/1991 | Friedman et al. | ........... | 166/288 |
| 5,151,131 A * | 9/1992 | Burkhalter et al. | ......... | 106/822 |
| 5,199,492 A | 4/1993 | Surles et al. | ................. | 166/295 |
| 5,363,917 A | 11/1994 | Jennings et al. | ............ | 166/288 |
| 5,386,875 A | 2/1995 | Venditto et al. | ............ | 166/308 |
| 5,551,514 A | 9/1996 | Nelson et al. | ............... | 166/280 |
| 5,567,088 A | 10/1996 | Shotts et al. | ................. | 405/270 |
| 5,791,415 A * | 8/1998 | Nguyen et al. | .......... | 166/280.1 |
| 5,806,593 A | 9/1998 | Surles | .......................... | 166/270 |
| 6,257,335 B1 * | 7/2001 | Nguyen et al. | .......... | 166/280.2 |
| 6,283,214 B1 | 9/2001 | Guinot et al. | ............... | 166/297 |
| 6,364,020 B1 | 4/2002 | Crawshaw et al. | ......... | 166/300 |
| 6,431,278 B1 | 8/2002 | Guinot et al. | ............... | 166/252.5 |
| 6,450,260 B1 | 9/2002 | James et al. | ................. | 166/277 |
| 6,776,236 B1 * | 8/2004 | Nguyen | ....................... | 166/279 |
| 2003/0230408 A1 | 12/2003 | Acock et al. | ................ | 166/297 |

* cited by examiner

*Primary Examiner*—George Suchfield
(74) *Attorney, Agent, or Firm*—David Cate; Tim Carington; Robin Nava

(57) ABSTRACT

It is proposed a method for completing an unconsolidated interval, including particulates, in a subterranean formation, including a consolidation steps. The consolidation step is performed by injection of an aqueous solution of colloidal particles with a pH modifier and/or an ionic-strength modifier. A hard gel is formed that holds the particulates together. The consolidation is followed by hydraulic fracturing. Diversion towards area of less permeability may be enhanced by the use of micrometric particles.

25 Claims, 5 Drawing Sheets

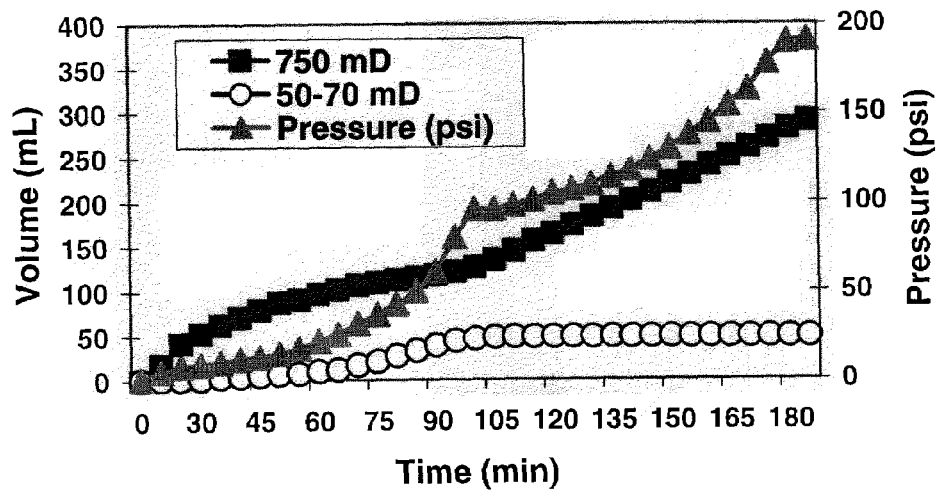
Figure 5
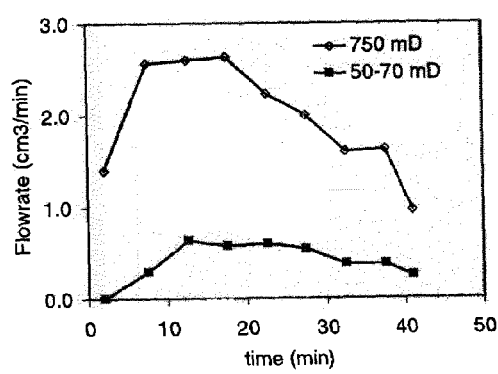
Figure 6-A
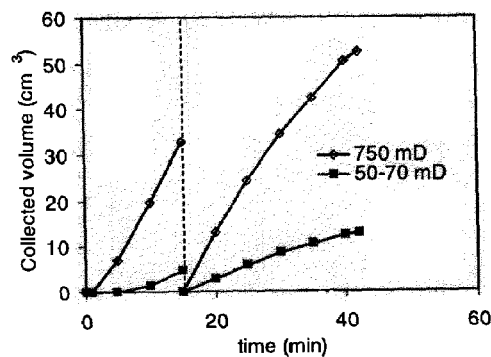
Figure 6-B

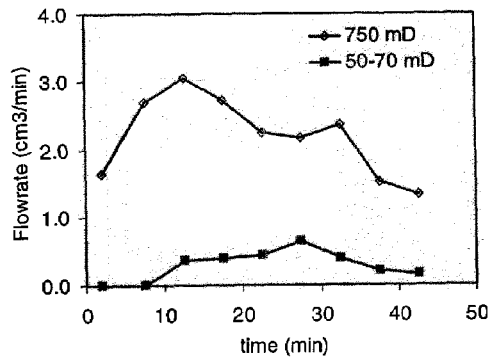
Figure 7-A
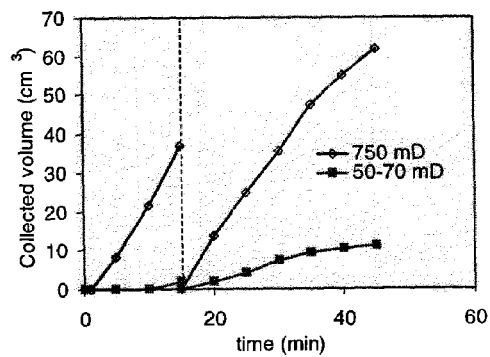
Figure 7-B
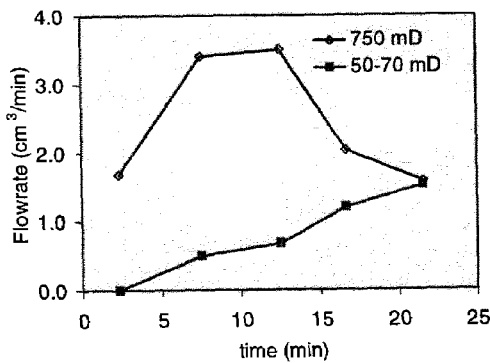
Figure 8-A
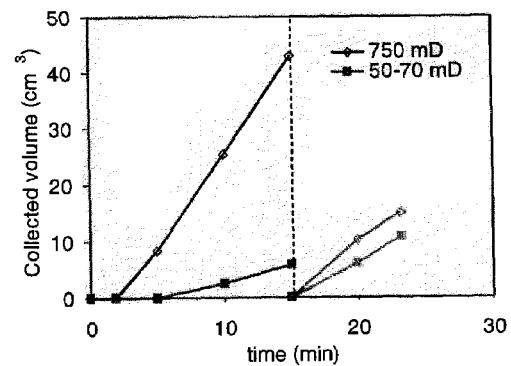
Figure 8-B

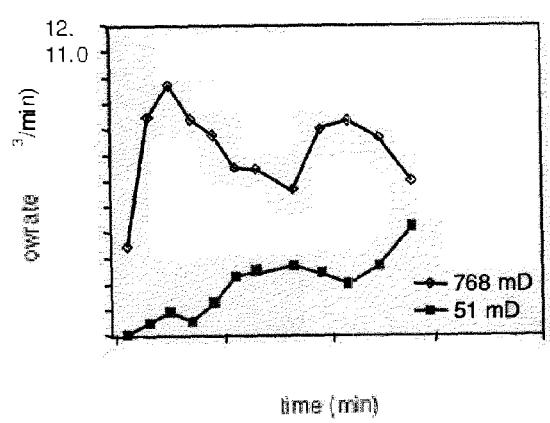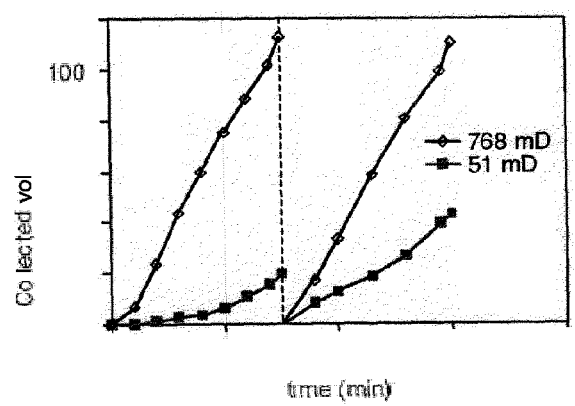
Figure 9-A                    Figure 9-B

METHOD OF COMPLETING POORLY CONSOLIDATED FORMATIONS

BACKGROUND OF INVENTION

This invention relates generally to completion methods of subterranean wells and more particularly to methods and means for completing poorly consolidated formations whereby sand production is eliminated or reduced.

Hydrocarbon fluids such as oil and natural gas are obtained from a subterranean geologic formation, i.e., a reservoir, by drilling a well that penetrates the hydrocarbon-bearing formation. Once a wellbore has been drilled, the well must be completed; a completion involves the design, selection, and installation of equipment and materials in or around the wellbore for conveying, pumping, or controlling the production or injection of fluids. After the well has been completed, production of oil and gas can begin.

Hydraulic fracturing is a primary tool for improving well productivity by placing or extending channels from the wellbore to the reservoir. This operation is essentially performed by hydraulically injecting a fracturing fluid into a wellbore penetrating a subterranean formation and forcing the fracturing fluid against the formation strata by pressure. The formation strata or rock is forced to crack and fracture. Proppant is placed in the fracture to prevent the fracture from closing and thus, provide improved flow of the recoverable fluid, i.e., oil, gas or water.

Where the formation is "soft" or poorly consolidated, small particulates typically of sand present in the formation may travel with the hydrocarbons. Such a production of sand is highly undesirable since it erodes surface and subterranean equipment, requires a removal process before the hydrocarbon can be process and eventually, counteracts the suitable effects of stimulation techniques such as acid stimulation.

The most common approach to minimize flow of small particulate is to filter the produced fluids through a gravel pack retained by a screen. The produced fluids travel through the gravel pack and the screen without substantially reducing the production before entering the wellbore while the smaller particulates are blocked. However, this technique is relatively onerous and with time, the gravel and the screen may be plugged by scale or eroded by the sand.

This explains the development of so-called screenless completion techniques. These techniques typically involve the injection of a consolidating fluid including a resin, a curing agent, a catalyst and an oil wetting agent. The resin sets in the formation, consolidating it and reducing the concentration of free small particulates. Examples of consolidating fluids and of methods for their use are reported for instance in their use U.S. Pat. Nos. 5,806,593; 5,199,492; 4,669,543; 4,427,069; and 4,291,766.

Conventional consolidating fluids tend to have relatively long setting times. Therefore, the fluids tend to keep flowing into the areas of least resistance, leaving the others untreated. This drastically limits the length of wellbore that can be treated in a single application to no more than about 6 meters (20 feet). Further, poor results are achieved with heterogeneous formations consisting for example of layers having different permeabilities. Resin-based consolidation systems are known to be very complicated to apply, for instance requiring up to five treatment stages and often raise environmental issues.

In an effort to obviate the disadvantages of conventional fluids, multiple wells treatments have been proposed. Most of them include either an emulsion or a foam. U.S. Pat. No. 5,363,917 teaches a foamed consolidating fluid which can support combustion of hydrocarbons in the formation. Products of the hydrocarbon combustion consolidate the formation. U.S. Pat. Nos. 5,010,953 and 5,567,088 disclose a consolidating fluid provided as an aerosol in steam. The former patent teaches that steam maintains void spaces in the formation during setting of a polymerizable compound, e.g. furfuryl alcohol. U.S. Pat. No. 6,364,020 teaches emulsions comprising at least two discontinuous phases comprising a gelling polymer, such as a polysaccharide, in one phase and an inorganic or organic crosslinker in another.

Different methods of completing an unconsolidated formation with or without a consolidation treatment are known. U.S. Pat. No. 5,551,514 proposes a multi-stage consolidation followed by a hydraulic fracturing treatment in which proppant flowback control techniques are employed. U.S. Pat. No. 6,450,260 describes a method of performing the technique patented in U.S. Pat. No. 5,551,514, using a flexible gel system.

Other methods to minimize sand production involve determining the direction of fracture propagation and orienting or shaping perforations (See U.S. Pat. Nos. 5,386,875 and 6,283,214). U.S. Pat. No. 6,431,278 defines a curve that correlates the percentage of flow through out-of-phase perforations with the fracture conductivity over formation permeability. Given a desired production flow, formation conductivity may be defined. This allows the well operator to design and perform a fracturing operation to achieve the conductivity necessary to produce the well below the critical drawdown pressure for sand production.

Though some successes have been obtained with most of the above-mentioned techniques, none of them has achieved large commercial acceptance, in particular in view of the technical and cost limitations.

It is therefore an object of the present invention to provide an improved method of completing an unconsolidated interval.

SUMMARY OF INVENTION

One aspect of the present invention is a method for completing in a subterranean formation an unconsolidated interval susceptible to produce particulates such as sand, including the step of consolidating said interval by injecting into said interval an aqueous solution of colloidal particles and of a pH modifier and/or an ionic-strength modifier to form a hard gel that holds the particulates together and then, the step of hydraulically fracturing the consolidated interval.

Another aspect of the present invention is a method for completing in a subterranean formation an unconsolidated interval susceptible to produce particulates such as sand, including the step of consolidating said interval by injecting into said interval an aqueous solution of a mixture of colloidal particles, of a pH modifier and/or an ionic-strength modifier to form a hard gel that holds the particulates together, and of a diverting agent to promote uniform flowrates of the aqueous solution through regions of the interval with dissimilar permeabilities and then, the step of hydraulically fracturing the consolidated interval.

BRIEF DESCRIPTION OF DRAWINGS

The above and further objects, features and advantages of the present invention will be better understood by reference to the appended detailed descriptions, and to the drawings wherein:

FIG. 5 shows the collected volumes of fluid through the sand packs of low (50–70 mD) and high (750 mD) permeabilities, and the inlet pressure for both sand packs, in an experiment performed using the equipment described in FIG. 4. Plugging of the low permeability, with subsequent preferential flow through the high permeability core was observed.

FIG. 6 shows the average flowrates (6-A) and collected volumes of fluid at the exits of the cells (6-B) in an experiment performed using the equipment depicted in FIG. 4, when a formulation of micrometric particles is added to the colloidal silica solution to improve diversion of flow toward the low permeability sandpack.

FIG. 7 shows similar results to those shown in FIG. 6, with another formulation of micrometric particles;

FIG. 8 shows similar results to those shown in FIG. 6, when a formulation of precipitated silica particles is added to the colloidal silica solution to improve diversion of flow toward the low permeability sandpack.

FIG. 9 shows similar results to those shown in FIG. 6, when the formulation of mica particles and starch reported for FIG. 6 is added to the colloidal silica solution to improve diversion of flow toward the low permeability sandpack, and the system is pre-flushed with a buffer solution to precondition the pH of the sandpacks.

DETAILED DESCRIPTION

Figure 1:
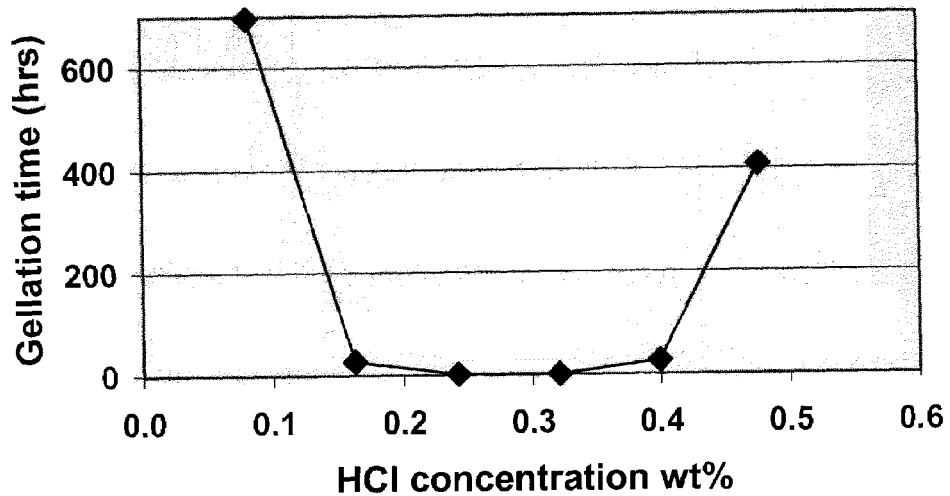
FIG. 1 shows the variation of the gelling time at room temperature of a colloidal silica solution depending on the concentration of hydrochloric acid.

The first step of the method of completing poorly consolidated formations according to the present invention is consolidating said formations by injecting a fluid including a colloidal suspension.

Colloidal suspensions are typically dispersion of discrete very small particles, spherical or elongated in shape, charged so that the repulsion between the same charged particles stabilizes the dispersion. Disturbance of the charge balance due for instance by removing the water, changing the pH or adding salt or water-miscible organic solvent, causes the colloidal particles to aggregate resulting in the formation of a gel.

The dispersion is prepackaged as a liquid, transparent in the case of relatively low concentration of particles, becoming opalescent or milky at higher concentration. In any case, the dispersion may be handled as a liquid, which greatly simplifies the dosage.

Commercial solutions of colloidal particles typically include silica (also known as silica sol) and oxides of aluminum, antimony, tin, cerium, yttrium and zirconium. The particles are mostly spherical with particles sizes usually range from about 4 nm to about 250 nm but elongated particles, with a length up to 300 nm are also available and believed to be acceptable for the invention. The particles may have a negative or positive charge. Aqueous solutions of colloidal silica particles, with particles sizes ranging between about 4 nanometers and about 100 nanometers have been found to have an excellent injectivity in sand pack with permeabilities as low as 50mD. Preferred colloidal particles have a size between 4 and 22 nanometers. This unique property allows a full treatment of the matrix over a depth of several feet. Without willing to be bond by any theory, it is believed that upon the addition of a pH modifier and/or an ionic-strength modifier, the inter-particle collision rate is increased and a siloxane bonds (Si—O—Si) are formed. This results into a hard gel that holds together the loose particles of the unconsolidated formation (sand grains). Indeed, after consolidation according to the invention, a pack of sand that before treatment exhibits absolutely no cohesion (sand flowing like in an hourglass) presents a compressive strength of no less than about 250 psi and appears like a solid rock.

Commercial silica sols are available at concentrations running between 15 to 50 wt %. Those commercial solutions can be used as such or diluted to a lower silica content. For examples, sols containing between 25 and 50 wt % of silica are generally used for the purposes of this invention but can be diluted up to 2 wt %. Note that the volume of injected solution typically remains the same when diluted solutions are used but a gel of lower compressive strength is formed.

Freezing temperatures cause crystals of ice to form in colloidal silica solutions, which increases the concentration of silica in the unfrozen portion and accelerates gelation of the silica-rich fraction. On thawing, the gelled silica does not redisperse but remains as a sediment in the melted ice. As a result, the melted material also contains a reduced concentration of dispersed silica particles and is usually unsuitable for use. Irreversible gelation of colloidal silica at temperatures below 0° C. can be prevented by mixing said colloidal silica solution with ethylene glycol, propylene glycol or methanol at a concentration comprised between 0.1 to 10 wt %, preferentially between 0.1 and 5 wt %.

The gel formation is triggered by a pH modifier and/or an ionic-strength modifier. According to one embodiment of the present invention, said ionic-strength modifier may be a salt. In this case, the colloidal silica suspension (e.g., Ludox®) is mixed with a brine (the salts contained in this brine are preferentially potassium chloride, sodium chloride, calcium chloride but can also be any mineral or organic salts or compounds susceptible to modify the ionic strength of the colloidal solution). As salt is added, the counter ions (in a salt-free sol, the positive/negative counter ions balancing the negative/positive surface charge are diffusely oriented around the particle) move much closer to the particle surface, which reduces the distance through which the repelling forces act. This causes a reduction in sol stability by increasing the probability of interparticle collision and this induces the formation of a hard gel. The gelation time can be adjusted with the brine concentration or the temperature. Particle size distribution and particle concentration can also effect gelation time.

According to another embodiment of the present invention, said pH modifier is an acid or a base. Colloidal silica dispersions used for sand consolidation applications have mostly a pH between 8 to 11 but can also be acidic (pH around 4). By adding an acidic solution/basic solution, the pH of the colloidal dispersion can be decreased/increased. By the way, the charges on the surface of the silica particles are decreased and the particles can come into contact and formed siloxane bonds. The tendency of most colloidal silica to gel is greatest at pH 5–6. The gelation time can be adjusted with the pH of the solution and/or the temperature for a given silica particles size and concentration.

The concentration of the pH modifier and of the ionic strength modifier is comprised between 0.1 and 5 wt % and preferentially comprised between 0.1 and 1.5 wt %.

The volume of consolidating fluids to inject is preferably equal to at least about twice the volume of the pores of the area to be consolidated. Said volume is usually no more than 10 times the volume of the pores in the area to be consolidated. In general, the area to be consolidated has a depth of between about 15 and about 90 cm, typically of about 30 cm.

Where the formation to be consolidated is heterogeneous, the consolidation process may be performed following an hesitation technique, whereby a portion of the consolidation fluids is pumped, then pumping stops over a period so that the zones of higher permeability and therefore higher injectivity—are consolidated. The staged procedure is repeated until all the consolidation fluid has been pumped.

According to another embodiment of the present invention, the consolidation fluid includes not only the colloidal particles but also micrometric particles such as precipitated silica particles for instance. By micrometric particles, it is hereby understood particles in the range of about 0.5 to about 100 $\mu$m, and most preferably systems having at least 80% of ranging between about 1 and about 60 $\mu$m. The micrometric particles tend to penetrate into the areas of higher permeabilities and start forming low-permeability cakes on the reservoir walls, thereby diverting the consolidation fluid to the areas of lower permeabilities and promoting uniform flowrates through consolidating zones with uneven permeabilities. Said micrometric particles may be for instance mica, precipitated silica, silica fumes, non-swelling clay or starch.

EXAMPLE 1

Selection of Suspension

Ten commercial suspensions of aqueous colloidal silica were tested. Some characteristics of the suspensions are reported in Table 1 below, including the charge (N: negative, P: positive), the average particles size, the silica content, the specific surface and the pH. The suspensions were gelled either by addition of salt (2 ml of NaCl 4M added to 14 ml of colloidal suspension); see results in Table 2, or by addition of hydrochloric acid (aqueous solution at 15 wt %) to 15 ml of colloidal suspension; see results in Table 3. After 2 days at 66° C., the gel resistance was estimated with a spatula, by exerting a low stress (gel resistance 1) or a high stress (gel resistance 5). A value ranging between 1 and 5 was attributed depending on the gel distance (1 for very low gel strength, 5 for high gel strength).

TABLE 1

| # | Charge | Av. Part. Size (nm) | Silica (wt %) | Ssp (m²/g) | pH |
|---|---|---|---|---|---|
| 1 | N | 7 | 30 | 345 | 10 |
| 2 | N | 12 | 30 | 220 | 8.9 |
| 3 | N | 12 | 40 | 220 | 9.7 |
| 4 | N | 22 | 50 | 140 | 9 |
| 5 | N | 4 | 15 | Unknown | 11 |
| 6 | N | 100 | 50 | Unknown | 9 |
| 7 | N | 40 | 50 | 80 | 9.5 |
| 8 | N | 12 | 30 | 215 | 8.2 |
| 9 | N | 13–14 | 30 | 210–230 | 9.6 |
| 10 | P | 12 | 30 | 230 | 4.5 |

TABLE 2

| # | Gel resistance |
|---|---|
| 1 | 4.5 |
| 2 | 3 |
| 3 | 4.5 |
| 4 | 4.5 |
| 5 | 2.5 |
| 6 | 3 |
| 7 | 4 |
| 8 | 1 |
| 9 | 1 |
| 10 | 1 |

TABLE 3

| | HCl 15 wt % | pH | | |
|---|---|---|---|---|
| # | (mL) | Before | After | Gel resistance |
| 1 | 0.5 | 10 | 7 | 4 |
| 2 | 0.3 | 9 | 3 | 2 |
| 3 | 0.3 | 10 | 7 | 4 |
| 4 | 0.3 | 9 | 3 | 4 |
| 5 | 0.75 | 11 | 8 | 3 |
| 6 | 0.3 | 9 | 2 | 1 |
| 7 | 0.3 | 9 | 3 | 2 |
| 8 | 0.2 | 8 | 2 | 1 |
| 9 | 0.5 | 10 | 6 | 1 |
| 10 | 0.2 | 4.5 | 3 | No gel |

These preliminary tests show that the suspensions with the smallest size of colloidal particles (below 10 nanometers provide a better gel strength. The higher the concentrations in particles, the stronger the gel. It was further found that smaller particles and higher concentrations both lead in the laboratory to a faster gel development.

EXAMPLE 2

Optimum pH

The suspension #3 of Example 1 was selected. To 15ml of suspension, various amounts of hydrochloric acid were added. The relation between the total HCl concentration in the suspension and the gelling time (in hours) at room temperature is depicted FIG. 1. The shortest gelling time was obtained with an acid concentration of 0.32 wt %, corresponding to a pH between about 6 and about 7.

When the same test was repeated with the suspension #1 of Example 1, it was found that the shortest gelling time was obtained with a pH between about 5 and about 6. This shows that when acid is used to cause gelation, the concentration should preferably be adjusted for the pH of the suspension to be just slightly acidic (pH between about 5 and about 7) to obtain the shortest gelation time.

EXAMPLE 3

Injection Tests

Figure 2:
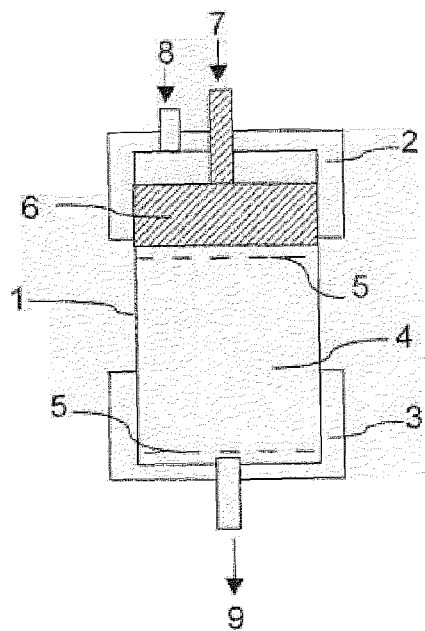
FIG. 2 is a schematic diagram of the device used to evaluate the infectivity of colloidal silica into sand packs of various permeabilities.

FIG. 2 is a schematic diagram of the device used to evaluate the injectivity of colloidal silica into sand packs of various permeabilities. This device includes a tubular cell 1, closed at one extremity with a top cap 2 and with a lower cap 3 at the other extremity. A sand pack 4 is placed into the cell 1, between two mesh screens 5. A piston 6 includes a fluid inlet 7 for the injection of the treatment and pretreatment fluids. The cell is further linked to a gas source 8 such as nitrogen that allows to pack the sand by pushing on the piston. The lower cap comprises a fluid outlet 9 to collect the fluids that have traveled through the sand pack 4.

A 750 mD sand pack was preflushed with a 2 wt % KCl brine before the injection of the colloidal silica suspension #1 of Example 1, and a concentration of hydrochloric acid of about 0.45 wt % (pH between 6 and 7). The injection pressure was only 6 psi at ambient temperature. The cell was left in oven for a night at 93° C. The returned permeability was less than 1 mD.

A 50 mD sand pack was preflushed with HCl solution at pH 4. The test was performed at 82° C. The same treatment fluid as in the high permeability pack was injected with an injection pressure of about 50 psi. The cores cured 3 days in oven at 93° C. The returned permeability was less than 1 mD.

EXAMPLE 4

Compressive Tests

The unconfined compressive strength (UCS) of consolidated cores was measured after several weeks of curing at 65° C. Three sand packs having an initial permeability of about 50–70 mD, about 750 mD and about 3D were tested (2 tests were performed for each sand pack). The sand packs were consolidated with the colloidal silica #3 of Example 1, with KCl used as ionic-strength modifier.

Figure 3:
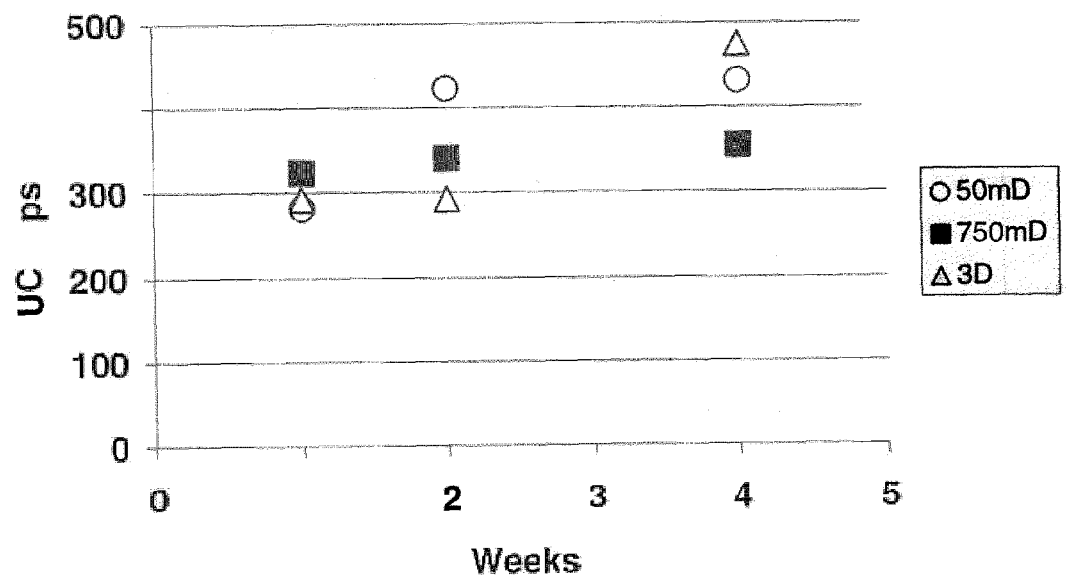
FIG. 3 shows measurements of the unconfined compressive strength (UCS) of packs of sand with different permeabilities via formation of gels of colloidal silica particles.

The results are shown FIG. 3. In all cases, the formation of gels led to the attainment of consolidated cores with compressive strengths ranging between 250 and 500 psi.

EXAMPLE 5

Injectivity and Diversion without Diverting Agents

The formations to be consolidated are often inhomogeneous with zones of lower and higher permeabilities. When a consolidating fluid is injected into such of formation, it preferably invades the zones of higher permeabilities. If the gelling time of the consolidating fluid is long compared to the injection time, it is likely that none of the zones of lower permeabilities is consolidated.

Figure 4:
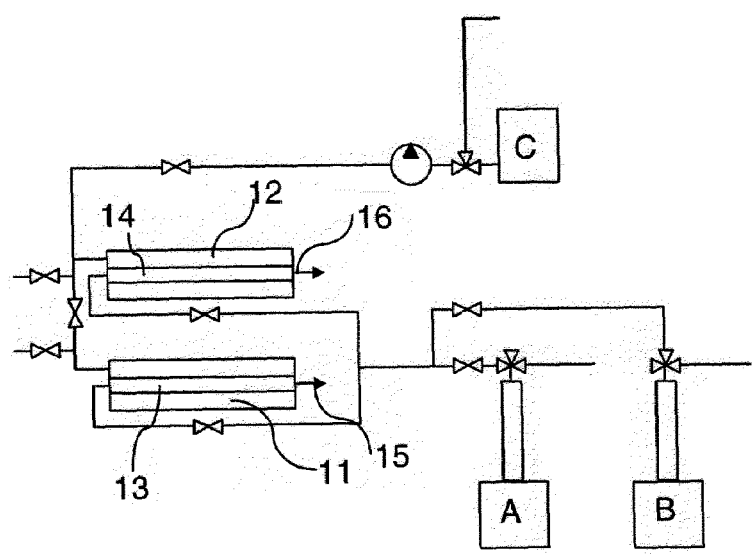
FIG. 4 shows the basic configuration of the equipment used to perform sand consolidation tests of sandpacks exhibiting different permeabilities, to simulate the operation of simultaneous consolidation of intervals with dissimilar permeabilities.

To evaluate the possibility of providing a treatment along the whole interval to be consolidated, the experimental device depicted FIG. 4 was used. The equipment consists of two Hassler cells (11 and 12) connected in parallel, in which the sandpacks (13 and 14) exhibiting different permeability are confined. Fluids are pumped from the positive displacement pumps A and B and collected through the exits of the cells (15 and 16). The confining pressure is set hydraulically with pump C, and an electrical heating system is coupled to the cells to attain a desired testing temperature.

The cell 11 is filled with a sand pack core 13 having a permeability of about 50 mD. The cell 12 is filled with a sand pack core 14 having a permeability of about 750 mD. Each sand pack has a diameter of 1 inch and a length of 1 foot. The treatment is performed at 93° C. and a confining pressure of 6.9 MPa. Two pore volumes of 2 wt % KCl and 2 pore volumes of HCl at pH 4 were used as preflush. The consolidation treatment consisted of the colloidal silica formulation #3 of Example 1, with a pH adjusted to 8. FIG. 5 shows the volume collected at the outlets 15 and 16 of respectively cells 11 and 12 and the injection pressure. During about 25 minutes, no fluid is collected from outlet 15, only the high permeability sand pack is consolidated. At the end of this first phase, the diversion begins and fluid is collected at outlet 16. At about 103 minutes, the low permeability pack 13 is plugged. Plugging of the low permeability, with subsequent preferential flow through the high permeability core was observed.

EXAMPLE 6

Injectivity and Diversion with Diverting Agents

Example 5 proved that a complete treatment of an heterogeneous zone may be achieved with a consolidation fluid based only on colloidal silica, the addition of larger micrometric particles, having sizes between about 0.5 and about 100 μm may reduce substantially the duration of the treatment, and thereby the required volume to be pumped. Three types of larger particles were tested. Their particle size distribution is provided in Table 4 below. The particle size distribution is such that 80% of the particles A are within about 4.7 and about 51.8 μm.

TABLE 4

|  | A | B | C |
| --- | --- | --- | --- |
| $d_{05}$ | 14.5 μm | 23.2 μm | 3.4 μm |
| $d_{0.1}$ | 4.7 μm | 6.7 μm | 1.7 μm |
| $d_{09}$ | 51.8 μm | 58.1 μm | 7.0 μm |

The experimental device of FIG. 4 was used. The consolidating fluid was injected at 93° C. at a confining pressure of 6.9 MPa. The pH of the consolidating fluids was adjusted between 7 and 8, with a solution at 15 wt % of HCl. To the consolidating fluids of Example 5, solutions of micrometric particles A, B and C were added at concentrations between 0.1 wt % and 0.5 wt %.

FIG. 6 shows the average flowrates (6-A) and collected volumes of fluid at the exits of the cells (6-B) in an experiment performed using the equipment depicted in FIG. 4, when a formulation of mica particles and starch (particle sizes between 0.5 μm and 100 μm, mean diameter 14.5 μm) is added to the colloidal silica solution to improve diversion of flow toward the low permeability (50–70 mD) sandpack when the second core is a high-permeability core (750 mD).

With particles A at 0.25 wt %, it is observed that the beginning of the consolidation of the low permeability core occurs after only about 10 minutes and that a ratio of flowrates of 4:1 (high permeability:low permeability) is attained. A ratio between 10:1 and 15:1 can be expected without diverting agent. Therefore, the addition of larger micrometric particles indeed increases the relative flowrate through the low permeability core. After about 40 minutes, both cores appear to be plugged.

FIG. 7 shows the average flow rates along time (FIG. 7-A) passing through the high-permeability core (750 mD) and the low permeability core (50 mD) for the fluid comprising particles B (0.5 wt % in the example given). The volumes of liquid collected at the exit of each core are shown in FIG. 7-B. Particles B appear to be less effective than particles A, with a beginning of the consolidation of the low permeability core occurring after about 20 minutes and a average ratio of flow rates between the high and the low permeability cores of about 6:1.

FIG. 8 shows similar results to those shown in FIG. 6, when a formulation of precipitated silica particles (particle sizes between 0.5 μm and 100 μm, mean diameter 3.4 μm) is added to the colloidal silica solution to improve diversion of flow toward the low permeability (50–70 mD) sandpack.

A ratio of flowrates of nearly 1:1 (high permeability:low permeability) is attained with this diverting agent.

In FIG. 8-A is shown the average flow rates along time passing through the high-permeability core (750 mD) and the low permeability core (50 mD) for the fluid comprising particles C (0.1 wt % in the example given). The volumes of liquid collected at the exit of each core are shown in FIG. 8-B. Both cores appear to be consolidated almost simultaneously and the average ratio of flow rates between the high and the low permeability cores of about 1:1, showing that the combination of colloidal particles and micrometric particles similar to particles C leads to a homogeneous treatment of an inhomogeneous formation.

FIG. 9 shows similar results to those shown in FIG. 6, when the formulation of mica particles and starch reported for FIG. 6 is added to the colloidal silica solution to improve diversion of flow toward the low permeability (50–70 mD) sandpack, and the system is pre-flushed with a buffer solution to pre-condition the pH of the sandpacks. Particles A were used (0.5 wt % in the example given), with a pre-flush of buffer solution with pH 9.3 applied prior to the injection of the colloidal silica solution, which also contained a buffer agent to adjust its pH to 9.3. The volumes of liquid collected at the exit of each core are shown in FIG. 9-B. Both cores appear to be consolidated almost simultaneously and the average ratio of flow rates between the high and the low permeability cores of about 3:1, showing that more fluid can be injected and the diverting effect can improved by controlling the pH of the system.

The invention claimed is:

1. A method for completing an unconsolidated interval, including particulates, in a subterranean formation, including the step of consolidating said interval by injecting an aqueous solution of colloidal particles and of at least one element selected from the group consisting of a pH modifier and/or an ionic-strength modifier to form a hard gel that holds the particulates together and then, the step of hydraulically fracturing the consolidated interval.

2. The method of claim 1, wherein said colloidal particles are charged.

3. The method of claim 1, wherein said colloidal particles have an average diameter between 4 and 100 nm.

4. The method of claim 3, wherein said colloidal particles have an average diameter between 4 and 22 nm.

5. The method of claim 1, wherein said colloidal particles are silica particles.

6. The method of claim 5, wherein said colloidal silica solution contains between 2 and 50 weight percent of silica.

7. The method of claim 6, wherein said colloidal silica solution contains between 25 and 50 weight percent of silica.

8. The method of claim 5, wherein said colloidal particles are charged.

9. The method of claim 5, wherein said colloidal silica solution contains ethylene glycol, propylene glycol or methanol at a concentration between about 0.1 and 10 weight percent.

10. The method of claim 9, wherein said colloidal silica solution contains ethylene glycol, propylene glycol or methanol at a concentration between about 0.1 and 5 weight percent.

11. The method of claim 1, wherein the consolidated interval has compressive strength greater than 250 psi.

12. The method of claim 1, wherein said interval is open-hole.

13. The method of claim 1, wherein said interval is cased hole and perforated.

14. The method of claim 1, wherein the ionic-strength modifier is a brine.

15. The method of claim 1, wherein the pH modifier is an acid.

16. The method of claim 1, wherein the pH modifier is a base.

17. The method of claim 1, wherein the concentration of the pH modifier and/or of the ionic strength modifier is comprised between 0.1 and 5 wt %.

18. The method of claim 17, wherein the concentration of the pH modifier and/or of the ionic strength modifier is comprised between 0.1 and 1.5 wt %.

19. The method of claim 1, wherein the area to be consolidated has a depth of between about 15 and about 90 cm.

20. The method of claim 1, wherein in the step of hydraulically fracturing, the fracture is designed to have a length greater than about twice the depth of the consolidated interval.

21. The method of claim 1, further comprising stopping the pumping over a time period after injecting the consolidation fluid, whereby zones of higher permeability are consolidated.

22. The method of claim 1, wherein the volume of injected consolidated fluid is between about 2 times and about 10 times the volume of the pores of the formation to be consolidated.

23. A method for completing an unconsolidated interval, including particulates, in a subterranean formation, including the step of consolidating said interval by injecting into said interval an aqueous solution of colloidal silica, of micrometric particles, of a pH modifier and/or of an ionic-strength modifier to form a hard gel that holds the particulates together and then, the step of hydraulically fracturing the consolidated interval.

24. The method of claim 23, wherein said micrometric particles are selected from the group consisting of mica, precipitated silica, silica fumes, non-swelling clay and starch.

25. The method of claim 23, wherein said micrometric particles having 80% of their particle sizes ranging between about 1 and about 60 $\mu$m.

* * * * *